June 21, 1955  A. S. DAVIS, JR  2,711,226
ELECTRIFIED CENTRIFUGAL GAS CLEANING DEVICE
Filed July 12, 1954
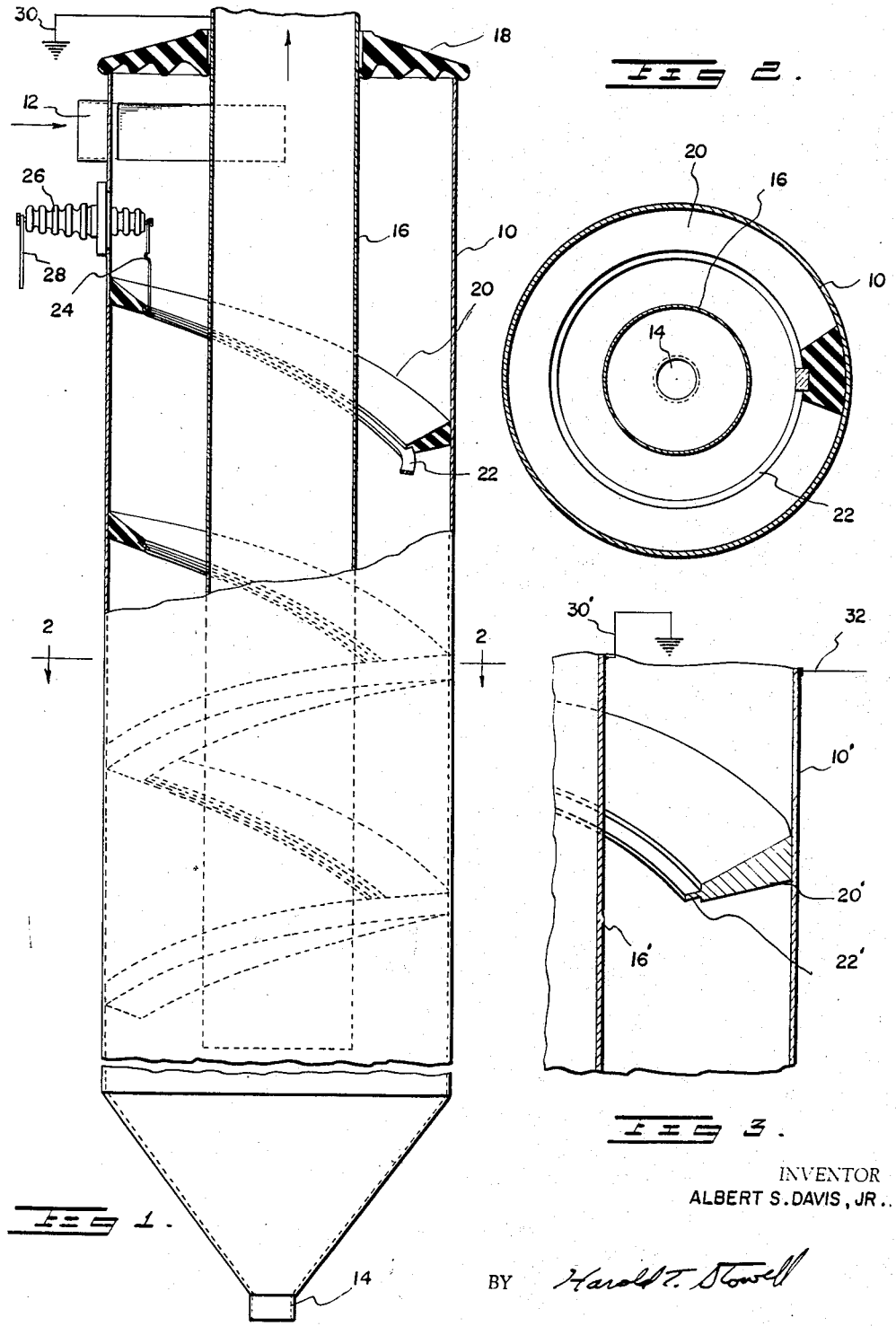
INVENTOR
ALBERT S. DAVIS, JR..
BY
ATTORNEY

United States Patent Office 2,711,226
Patented June 21, 1955

2,711,226

ELECTRIFIED CENTRIFUGAL GAS CLEANING DEVICE

Albert S. Davis, Jr., Somerville, N. J., assignor to Research Corporation, New York, N. Y., a corporation of New York Application July 12, 1954, Serial No. 442,657

6 Claims. (Cl. 183—7)

This invention relates to electrostatic, centrifugal gas cleaning wherein gas bearing suspended particulate material, such as dust particles, ash particles, fine droplets of liquids or the like, is passed through a gas treating chamber wherein the gas stream is given a swirling or vortical movement whereby the larger and coarser particulate material is concentrated along the inner cylindrical surface of the chamber, and the gas is simultaneously subjected to corona discharge to cause the smaller particles to agglomerate and therefore increase their mass to a point where the centrifugal force of the swirling gas will move the agglomerated particles also to the inner cylindrical surface of the chamber.

It is an object of the invention to provide such an electrified centrifugal gas cleaning device that is highly effective and efficient in removing suspended particulate material from a stream of gas.

A further object is to provide such a device that has no moving parts, is simple to assemble and disassemble, is relatively inexpensive to manufacture and is compact in size.

A further object is to provide such a device that may be operated without corona discharge during periods when the gas stream to be treated contains an insignificant amount of fine particles requiring agglomeration.

These and other objects and advantages are accomplished by the present invention, the nature of which is set forth in the following general statement, and is illustrative of that which is set forth in the following description and illustrated in the accompanying drawings.

The nature of the invention may be stated in general terms as including a tubular gas separating member, means for introducing and vortically whirling gas at the upper end of said tubular member, outlet means at the lower end of the tubular member for a small portion of the gas stream containing the concentrated particulate material, an inner cylindrical outlet tube concentric with said tubular member, the upper end of the outlet tube projecting above the gas inlet end of the tubular member and the lower end of the outlet tube terminating slightly above the outlet from the tubular member, spiral gas passage defining means carried by the inner surface of said tubular member and extending toward the outer surface of the outlet tube and terminating axially thereof and means establishing an electrostatic field between said spiral gas-passage defining means and said outlet tube.

The invention will be more particularly described with reference to the accompanying drawings which show an illustrative embodiment of the constructions and principles constituting the invention:

Fig. 1 is a fragmentary elevational view in partial section of one form of the electrical centrifugal gas separating means of the invention;

Fig. 2 is a section substantially on line 2—2 of Fig. 1 and

Fig. 3 is an enlarged fragmentary vertical sectional view of a modified form of the present invention.

In reference to the drawings and in particular to Figs. 1 and 2 thereof 10 is an elongated separator tube of conductive material, but which may be constructed of semi-conductive or insulating material as is fully explained hereinafter.

At the upper end of the separator 10 is provided a tangential gas inlet 12 for the gases containing particulate material.

While in the drawings the gas inlet 12 is shown as tangential it is apparent that other forms of gas inlet means which will insure that the incoming gas is given a vortical or swirling movement may be provided in the apparatus of the invention as is well known in the art.

At the lower end of the separator 10 the sidewalls taper inwardly to form a constricted outlet 14 for a small portion of the gas stream containing the concentrated particulate material. The outlet 14 may be connected to conventional hopper means or directly to apparatus for further treating the collected material or for disposing thereof.

A cylindrical gas outlet tube 16 is concentrically positioned within the tubular separator tube 10. The upper end of the gas discharge tube 16 projects above the tangential inlet 12 of the separator tube 10 and is separated therefrom by closure plate 18. Additionally the closure plate 18 provides means for concentrically supporting the outlet tube 16 within the separator tube 10. The cover plate 18 is constructed of a dielectric material having good physical strength at high temperatures and resistant to corrosion and erosion. In the form of the invention shown in Figs. 1 and 2 cover 18 is constructed of ceramic material.

Secured to the inner wall of the separator tube 10 is a spiral gas-passage defining member 20 which extends longitudinally from slightly below the tangential inlet 12 to a point slightly above the lower end of the outlet tube 16. Radially it extends toward the outer surface of the gas outlet tube but terminates short thereof to provide an unrestricted gas flow passage along said outer surface.

Secured to the inner edge of the spiral gas-passage defining means 20 is a corona discharge emitting member 22 which may be provided with a serrated edge to aid in establishing corona discharge between the member 22 and the outer surface of the outlet tube 16. The corona discharge member 22 is electrically connected through conductor 24, insulator 26, and conductor 28 to a source of high voltage electricity, not shown in the drawing, while the discharge tube 16 is grounded as at 30.

The operation of the apparatus of the invention will be described in reference to the embodiments shown in Figs. 1 and 2, wherein separator tube 10, the outlet tube 16, and the corona discharge member 22 are of electrically conductive material and the cover plate 18, and the spiral gas-passage defining means 20 are constructed of electrically insulating material. A stream of gas having suspended therein both coarse and fine particulate material enters the tangential inlet 12 and swirls downwardly in the space between the separator tube 10 and the outlet tube 16. The spiral gas-passage defining means 20 aids in maintaining the vortical motion to the gas stream and suspended particles and the coarser and larger particles are moved by centrifugal force toward and along the inside wall of the separator tube 10.

The finer particles, most of which will exist in the gas stream between the outlet tube 16 and the discharge edge of member 22, will be agglomerated and their mass increased by corona discharge emitted from the member 22 due to the high potential field existing between member 22 and outlet tube 16. The increase in mass and therefore the increased contrifugal force will overcome the electrical field and the agglomerated particles will move toward the inner surface of the separator tube 10.

The movement of the agglomerated particles in the space between the corona discharge emitting member 22 and the outlet tube 16 will be against the electrical field, however, since the particles are carrying an electric charge as soon as they pass the corona discharge element 22 in a direction toward the inner wall of separator tube 10 they will be moved to that surface both by centrifugal force and by the electrical field.

As the gas stream approaches the lower end of outlet tube 16 the greater portion of the gas will turn sharply and pass upwardly out of tube 16. A small portion of the gas stream containing the coarser and agglomerated material passes out of the outlet 14 in the separator tube together with any particle thrown out of the gas stream as it turns about the lower edge of outlet tube 16 as in the operation of conventional concentric tube vortical separators.

Referring to Fig. 3 of the drawings a modified form of the invention is shown wherein the outlet tube 16', the separator tube 10', the spiral gas passage defining means 20', and the corona discharge emitting member 22', are all constructed of electrically conductive material and the outlet tube 16' is insulated from these members by an electrically insulating top member 18 as shown in Fig. 1 of the drawing. This form of the invention eliminates the necessity for an insulating bushing 26 as the high potential current may be connected directly to the separator tube 10 while the gas outlet tube 16 is connected to ground as at 30' and 32. With the elements of the separator constructed in this manner the agglomerated particles are moved to the inside wall of separator tube 10' by centrifugal force only and at all times they move against the electrostatic field existing between separator tube 10' and outlet tube 16'.

It is evident that other arrangements of the apparatus of the invention may be made without departing from the present invention. For example referring to Figs. 1 and 2, where it is desired to provide a neutral electrical zone in the space between the corona emitting element 22 and the separator tube 10 the elements may be constructed as follows:

The separator tube 10 and the spiral gas-passage defining member 20 may be constructed of electrically insulating material; corona discharge element 22 and outlet tube 16 may be constructed of conductive material and insulated from corona discharge emitting element 22 by separator tube 10, spiral gas directing vane 20 and insulator cover 18. In this form of the invention electrical connection may be made to the outlet tube 16 and the insulated separator tube 10 may be grounded.

It is also evident that the separator shown in Figs. 1 and 2 may be electrically connected so that conductors 28 and 24 are connected to the outlet tube 16 and the outer shell of the separator tube 10 connected to ground lead 30.

From the foregoing description it is evident that an extremely simple and efficient combined electrostatic and mechanical gas separator is provided. It is to be understood however, that the particular configuration, arrangement and construction of parts as shown and described herein is merely for the purposes of illustration and it is contemplated that there are other numerous and varied modifications thereof which fall within the intended spirit and scope of the present invention.

Having now described the invention, the construction and operation thereof and advantageous new and useful results obtained thereby the new and useful constructions are set forth in the hereinafter appended claims.

I claim:

1. A gas cleaning device comprising a tubular gas separating member, means for introducing and vortically whirling gas to be cleaned at the upper end of the separator member, outlet means at the lower end of the separator member for the gas stream containing the concentrated suspended material, an inner tubular gas outlet member concentric with said separator member, the upper end of the outlet member projecting above the gas inlet end of the separator member and the lower end of the outlet member terminating above the outlet at the lower end of the separator member, spiral gas-passage defining means carried by the inner surface of the separator member and extending toward the outer surface of the outlet member and terminating axially thereof and means establishing an electrostatic field between said spiral gas-passage defining means and said outlet member.

2. The invention defined in claim 1 wherein the spiral gas-passage defining means is constructed of insulating material and a corona discharge emitting member is secured to its inner edge.

3. The invention defined in claim 2 wherein the gas outlet member and the separator member are constructed of conductive material.

4. The invention defined in claim 3 wherein electrical connection is made to the corona discharge emitting member and to the gas outlet member.

5. The invention defined in claim 1 wherein the separator tube, spiral gas-passage defining member and the gas outlet member are constructed of conductive material and the separator tube and the spiral gas passage defining member are insulated from the outlet tube.

6. The invention defined in claim 1 wherein the separator member and the spiral gas-passage defining means are constructed of insulating material and said spiral gas-passage defining means has a conductive corona discharge emitting member secured to its inner edge.

References Cited in the file of this patent

UNITED STATES PATENTS

| | | |
|---|---|---|
| 1,372,710 | McGee et al. | Mar. 29, 1921 |
| 1,440,887 | Nesbit | Jan. 2, 1923 |
| 2,085,349 | Wintermute | June 29, 1937 |